US006211274B1

(12) United States Patent
Tanegashima et al.

(10) Patent No.: US 6,211,274 B1
(45) Date of Patent: Apr. 3, 2001

(54) ORGANIC-INORGANIC COMPOSITE CONDUCTIVE SOL AND PROCESS FOR PRODUCING THE SAME

(75) Inventors: Osamu Tanegashima; Kiyomi Ema, both of Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/325,338

(22) Filed: Jun. 4, 1999

(30) Foreign Application Priority Data

Jun. 5, 1998 (JP) .................................................. 10-174131

(51) Int. Cl.$^7$ ........................................................ C08K 3/00

(52) U.S. Cl. .......................... 524/399; 524/430; 524/432; 524/434

(58) Field of Search .................................... 524/399, 430, 524/432, 434

(56) References Cited

FOREIGN PATENT DOCUMENTS 0 678 779 A2 10/1995 (EP) .
0 795 565 A1 9/1997 (EP) .
64-44917 2/1989 (JP) .
64-71010 3/1989 (JP) .
1-313521 12/1989 (JP) .
5-170904 7/1993 (JP) .
6-76652 3/1994 (JP) .
6-219743 8/1994 (JP) .
6-287454 10/1994 (JP) .
7-90060 4/1995 (JP) .
7-144917 6/1995 (JP) .
9-12968 1/1997 (JP) .
9-198926 7/1997 (JP) .
10-231444 9/1998 (JP) .

*Primary Examiner*—Edward J. Cain
(74) *Attorney, Agent, or Firm*—Oliff & Berridge, PLC

(57) ABSTRACT

An organic-inorganic composite conductive sol, and a process for producing the same are disclosed. The organic-inorganic composite conductive sol comprises colloidal particles having a primary partical size of 5 to 50 nm of conductive oxide such as colloidal particles of conductive zinc antimonate, colloidal particles of conductive indium antimonate or a mixture thereof, and colloidal particles having a primary particle size of 2 to 10 nm of conductive polymer such as polythiophene or polythiophene derivative. The composite conductive sol is suitable for use in various fields such as transparent antistatic materials, transparent ultraviolet absorbing materials, transparent heat absorbing materials, transparent resistant materials, high refractive index hard coat agents and anti-reflecting agents of resins, plastics, glasses, papers, magnetic tapes, and the like.

13 Claims, 2 Drawing Sheets

ORGANIC-INORGANIC COMPOSITE CONDUCTIVE SOL AND PROCESS FOR PRODUCING THE SAME

BACKGROUND OF THE INVENTION

1. Field of the Invention

The present invention relates to an organic-inorganic composite conductive sol comprising colloidal particles of conductive oxide and colloidal particles of conductive polymer, and a process for producing the same. The organic-inorganic composite conductive sol according to the present invention is suitable for use in various fields such as transparent antistatic materials, transparent ultraviolet absorbing materials, transparent heat ray absorbing materials, transparent resistant materials, high refractive index hard coat agents and anti-reflecting agents of resins, plastics, glasses, papers, magnetic tapes, and the like.

2. Description of the Related Art

Antimony oxide-doped tin oxide, tin oxide-doped indium oxide, conductive sinc antimonate, conductive indium antimonate, conductive zinc oxide and the like are known as conductive oxides, and those materials are commercially available in the form of a powder, an aqueous sol or an organic solvent sol.

Japanese Patent Application Laid-open No. Hei 6-219743 (hereinafter simply referred to as "JP-A-") discloses a conductive anhydrous zinc antimonate having $ZnO/Sb_2O_5$ molar ratio of 0.8 to 1.2 and a primary particle size of 5 to 500 nm.

JP-A-7-144917 discloses conductive oxide particles comprising indium atom, antimony atom and oxygen atom with the proportion of 1:0.02 to 1.25:1.55 to 4.63 in the molar ratio of In:Sb:O, and having a primary particle size of 5 to 500 nm. It also discloses conductive oxide particles having a crystal structure of indium antimonate, comprising indium atom, antimony atom and oxygen atom with the proportion of 1: 0.83 to 1.25:3.58 to 4.63 in the molar ratio of In:Sb:O, and having a primary particle size of 5 to 500 nm.

Polyaniline, polyaniline derivatives, polythiophene, polythiophene derivatives, polypyrrole, polyacetylene, polyparaphenylene, polyphenylene vinylene and the like are known as a conductive polymer.

JP-A-6-287454 discloses a water-soluble conductive material containing a polymer such as polyaniline, polythiophene, polypyrrole, or poly(paraphenylene sulfide).

JP-A-5-170904 discloses a polyaniline derivative which is soluble in an organic solvent and shows high electric conductivity by doping.

JP-A-171010 discloses a conductive polymeric compound solution containing polyaniline or its derivative in a concentration of 0.5% by weight or more, or a conductive polymeric compound of polythiophene substituted by alkyl groups having 4 or more carbon number, and a diamine compound in an amount of 2 mol % or more to monomers constituting this conductive polymeric compound.

JP-A-6-76652 discloses a process which comprises contacting a solution obtained by dissolving monomer of pyrrole type, furan type, thiophene type, aniline type, benzidine type or the like in a solvent with a polymeric molded article by impregnating in the solution, and contacting with an oxidizing agent, thereby rendering the surface of the polymeric molded article conductive.

JP-A-1-313521, 7-90060 and 9-12968 disclose polythiophehe and polythiophene derivative, and a transparent antistatic coating agent comprising those composition.

Conductive oxide and conductive polymer can be used to an antistatic treatment of plastic molded articles, films and the like by mixing the same with an appropriate organic binder. In particular, a sol of conductive oxide fine particles having high transparency can be used as a transparent antistatic paint, utilizing the characteristics of the fine particles. The conductive oxide is electron-conductive. Therefore, if It is used as, for example, a transparent antistatic paint, conductivity of a coating layer is stable, and it also has an effect as an inorganic filler, so that a coating layer having high hardness can be obtained In a method using only the conductive oxide, if the amount of the conductive oxide blended to a binder increases, good conductivity can be obtained, and no problem arises on coloration of a coating layer. However, use of only the conductive oxide has the problems that transparency or flexibility of the coating layer decreases, and if the amount blended therein is decreased, it is difficult to develop conductivity. Further, if a process of, for example, drawing a coating layer and a substrate is conducted after the formation of the coating layer, distance between mutual conductive oxide particles becomes large, so that the problem arises such that the conductivity lowers.

On the other hand, the conductive polymer has a relatively good film-formability by itself, and therefore can be used alone depending on the use. However, since the conductive polymer is in the form of a colloidal solution, coating layer strength is weak, and in order to put it into practical use, it is necessary for use to mix the same with an organic binder, similar to the conductive oxide. If the blending amount of the conductive polymer to the organic binder is large, it shows a good conductivity, but where used as, for example, a transparent antistatic paint, there are disadvantages that the coloration of a coating layer increases, thereby decreasing transparency, and it is difficult to develop a coating layer hardness although flexibility of a film is excellent. Further, since the conductive polymer colloid consists of very fine particles, there are disadvantages that compatibility with a binder is poor and viscosity increases. Furthermore, if the amount of the conductive polymer blended is small, it is difficult to develop conductivity. It is also difficult for the conductive film using the conductive polymer to increase the thickness of the film from the view point of coloration and costs, so that it is difficult to obtain stability in conductivity of a film Where the conductive oxide colloid or conductive polymer colloid is used as an antistatic use, for example, where it is used as a transparent antistatic paint or where the sole use of the conductive oxide colloid or conductive polymer colloid does not exhibit a sufficient performance, for example where the blending amount is small or a coating layer is post-processed, defects of both the conductive oxide colloid and the conductive polymer colloid cannot be supplemented by merely mixing and using together the conductive oxide sol and the conductive polymer solution. In general, even if the conductive oxide sol and the conductive polymer are merely mixed, agglomeration and gelation occur, and such a product cannot be put into practical use.

SUMMARY OF THE INVENTION

Accordingly, an object of the present invention is to provide an organic-inorganic composite conductive sol and a process for producing the same, wherein the disadvantages of a conductive oxide sol and a conductive polymer colloidal solution are improved.

According to a first aspect of the present invention, there is provided an organic-inorganic composite conductive sol comprising colloidal particles of conductive oxide having a primary particle size of 5 to 50 nm, and colloidal particles of conductive polymer.

According to a second aspect of the present invention, in the organic-inorganic composite conductive sol of the first aspect of the invention, the colloidal particles of conductive oxide are colloidal particles of conductive zinc antimonate, colloidal particles of conductive indium antimonate, or a mixture thereof.

According to a third aspect of the present invention, in the organic-inorganic composite conductive sol of the first or the second aspect of the invention, the colloidal particles of conductive polymer have a primary particle size of 2 to 10 nm.

According to a fourth aspect of the present invention, in any one of the organic-inorganic composite conductive sol of the first to third aspects of the invention, the conductive polymer is polythiophene or polythiophene derivative.

According to a fifth aspect of the present invention, in any one of the organic-inorganic composite conductive sol of the first to fourth aspects of the invention, the proportion of the conductive oxide and the conductive polymer is 98/2 to 5/95 in the conductive oxide/conductive polymer weight ratio.

According to a sixth aspect of the present invention, there is provided a process for producing an organic-inorganic composite conductive sol of the first aspect of the invention, characterized in that a conductive oxide sol having a concentration of 0.1 to 5% by weight and a conductive polymer colloidal solution in a concentration of 0.01 to 0.5% by weight are mixed and then concentrated.

According to a seventh aspect of the present invention, in the process for producing an organic-inorganic composite conductive sol of the sixth aspect of the invention, the conductive oxide sol is an aqueous sol which does not substantially contain ions, and the conductive polymer the colloidal solution is an aqueous colloidal solution.

DETAILED DESCRIPTION OF THE PREFERRED EMBODIMENT

Figure 1:
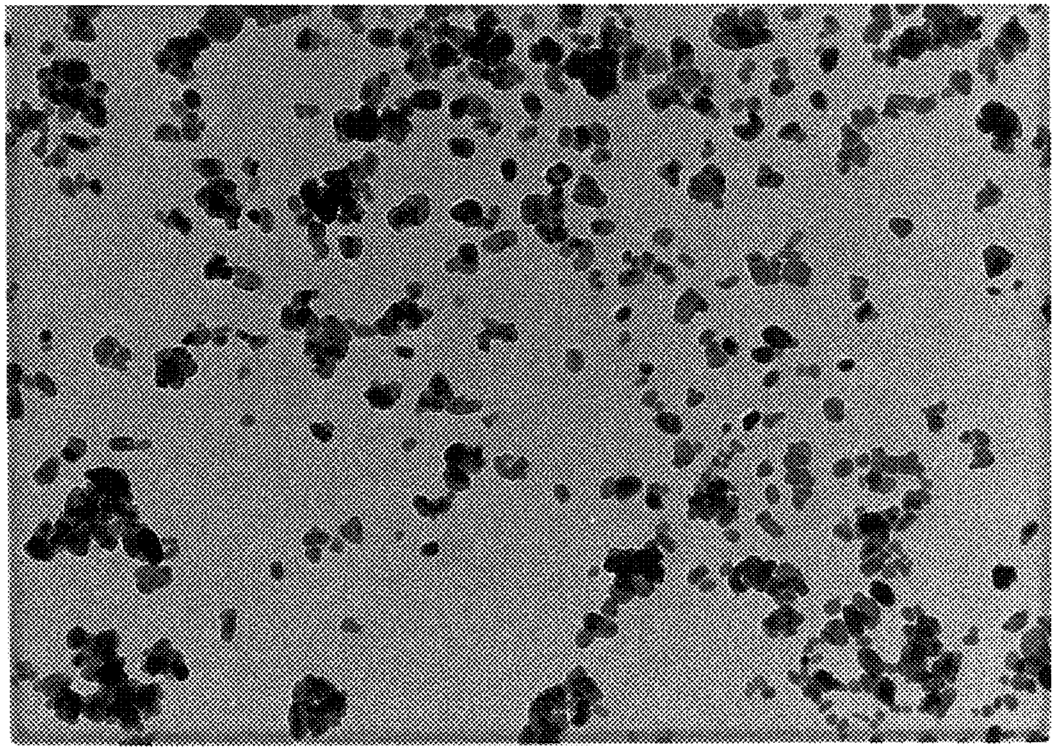
FIG. 1 is a transmission electron micrograph (magnification: 200,000) showing a particle structure of anhydrous zinc antimonate aqueous sol used in Example 1.

The present invention is described in detail below.

The conductive oxide used in the present invention has a primary particle size of 5 to 50 nm.

The "primary particle size" used herein does not mean a diameter of particles in an agglomerated state, but is determined as a diameter of one particle when individually separated, by observation with an electron microscope.

Examples of the colloidal particles of those conductive oxides include conductive oxides having high transparency such as antimony oxide-doped tin oxide, tin oxide-doped indium oxide, conductive zinc antimonate, conductive indium antimonate and conductive zinc oxide. Those can be used alone or as mixtures thereof. Those conductive oxides are commercially available as an aqueous sol or an organic solvent sol. Further, if necessary, this conductive oxide powder may be wet-ground in water or an organic solvent to form a sol for use. For example, anhydrous zinc antimonate sol obtained by the method described in JP-A-6-219743 can be used. That is, zinc compounds (such as zinc carbonate, basic zinc carbonate, zinc nitrate, zinc chloride, zinc sulfate, zinc formate, zinc acetate or zinc oxalate) and colloidal antimony oxides (such as diantimony pentoxide sol, diantitony pentoxide powder or fine particulate diantimony trioxide powder) are mixed in a $ZnO/Sb_2O_5$ molar ratio of 0.8 to 1.2, the resulting mixture is calcined at 500 to 680° C. to obtain anhydrous zinc antimonate, and the anhydrous zinc antimonate obtained is wet-ground in water or an organic solvent with, for example, sand grinder, ball mill, homogenizer, disper or colloid mill, thereby an aqueous sol or organic solvent sol of anhydrous zinc antimonate is obtained.

Further, indium antimonate obtained by the method described in JP-A-7-144917 can be used. That is, indium compounds (such as indium hydroxide, indium oxide, indium carbonate, basic indium carbonate, indium nitrate, indium chloride, indium sulfate, indium sulfaminate, indium oxalate or tetraethoxyindium and colloidal antimony oxides (such as diantimony pentoxide sol, diantimony pentoxide powder or fine particulate diantimony trioxide powder) are mixed in a In/Sb molar ratio of 0.8 to 1.2, the resulting mixture is calcined at 700 to 900° C. in air to obtain indium antimonate, the indium antimonate obtained is wet-ground in water or an organic solvent with, for example, sand grinder, ball mill, homogenizer, disper or colloid mill, thereby obtaining an aqueous sol or organic solvent sol of indium antimonate In particular, a conductive oxide aqueous sol which does not substantially contain ions is preferable.

The conductive polymer is preferably colloidal particles having a primary particle size of 2 to 10 nm, and examples thereof include polyaniline, polyaniline derivatives, polythiaphene, polythiophene derivatives, polypyrrole, polyacetylene, polyparaphenylene and polyphenylene vinylene. Examples of the dopant which can be used include $C1^-$, $Br^-$, $C10_4^-$, paratoluenesulfonic acid, sulfonated polystyrene, polymethacrylic acid and sulfonated polyvinyl alcohol.

In general, conductive polymers containing a dopant are commercially available as the conductive polymer in the form of powder or dispersion, and those can be used. In the present invention, this conductive polymer containing a dopant is called a conductive polymer. The conductive polymer used in the present invention is preferably one having conductivity equal to or higher than that of the conductive oxides, and polythiophene or its derivatives are particularly preferable. For example, polythiophene and polythiophene derivatives described in JP-A-1-313521, 7-90060 and 9-12968 can preferably be used.

In order to supplement mutually the defects of the conductive oxide sol and the conductive polymer colloid solution by using them together, even if a mere mixture of the conductive oxide sol and the conductive polymr colloid solution is used, the conductive oxide particles and the conductive polymer particles behave separately, and as a result, a sufficient effect by the combined use thereof cannot be obtained. Therefore, to obtain a sufficient effect by using the conductive oxide sol and the conductive polymer colloidal solution together, it is necessary to form a composite by mutual bonding or adsorption of the conductive oxide colloids and the conductive polymer colloids.

Further, the conductive oxide sol and the conductive polymer colloidal solution or an organic-inorganic composite conductive sol is used as, for example, a transparent antistatic paint. In this case, if the conductive oxide sol or the conductive polymer colloidal solution cause agglomeration or gelation, a sufficient transparency as a transparent antistatic paint cannot be obtained.

The form of colloidal particles of conductive polymers such as polyacetylene, polythiophene, polyaniline, polypyrrole, polyparaphenylene, polyparaphenylene vinylene and their derivatives greatly differs depending on its polymerization method and polymerization conditions, and colloidal particles having indefinite shape, fibrous shape, or particle shape are reported.

For example, regarding polyaniline, Adv. Mater. 1993, 5, No.4, pp. 300–305 describes spherical particles having a particle size of 100 to 200 nm. Polymer, 1993, vol. 34, No. 1, pp. 158–162 describes that N-substituted polyaniline derivatives form plumous agglomerates of several hundreds nm.

According to the observation with a transmission electron microscope, it is seen that the commercially available polyaniline or polythiophene exists as a mixture of spherical particles, fibrous particles having definite shape, and agglomerates of particles having indefinite shape. In particular, since the agglomerates of particles having indefinite shape are very similar in its form to plumous agglomerates of amorphous alumina hydrate colloidal particles, it is considered to be agglomerates of small colloidal particles.

On the other hand, transparent conductive oxide colloidal particles of tin oxide-doped indium oxide (ITO), antimony oxide-doped tin oxide (ATO), conductive zinc antimonate, conductive indium antimonate, conductive tin oxide or the like generally have a primary particle size of 5 to 50 nm and are present alone (as primary particles)or as small agglomerates.

As a result of observation with a transmission electron microscope, it was recognized that the commercially available polythiophene (Baytron P, trade name, a product of Bayer AG) was comprised of particles agglomerated Into a spherical shape of 10 to 100 nm, agglomerates of fibrous particles of a minor axis of 2 to 5 nm and a major axis of 50 to 100 nm, and agglomerates of particles of several nm having indefinite shape, and it was quantitatively confirmed that the amount of agglomerates of particles having a primary particle size of 2 to 10 nm is large.

It was confirmed that the commercially available polyaniline was comprised of monadispersed particles having a particle size of 2 to 5 nm, several to several tens of small agglomerates, further large agglomerates, and spherical particles (spherical agglomerates) having a particle size of 200 nm or more, although the number of these particle is small.

It can be said from those results that the conductive polymer colloids are basically ones that very small particles (several nm) weakly agglomerate in a random direction, and ones that the particles strongly bond to form fibrous particles or spherical particles. In particular, weak agglomerates can be made remarkably small agglomerates by appropriately selecting mechanical force, concentration, PH (in case of an aqueous solution), solvent and the like.

The above-described conductive oxide colloids each contain basic oxide, therefore colloids as a whole and all sites are not negatively charged as in colloidal silica, but the colloids are positively charged partially or entirely. For example, in zinc antimonate sol, the site of—O—$Sb^{5+}$—O— is negatively charged, but the site of —O—$Zn^{2+}$—O— is positively charged, in neutral or acidic condition. On the other hand, the conductive polymer generally contains an acid as a dopant, and is negatively charged. Therefore, the conductive polymer colloidal solution and the silica sol can be mixed very well, but the conductive oxide sol and the conductive polymer colloidal solution are mixed, it leads remarkable agglomeration or gelation. In particular, in the case that the particle size of the conductive polymer colloids is small, this phenomenon remarkably occurs. Therefore, it is not easy to use the conductive oxide sol and the conductive polymer colloidal solution together.

The surface of the conductive oxide colloidal particles (monodispersed or small cluster particles) can be covered with the conductive polymer colloids by using the conductive oxide colloids and the conductive polymer colloids in hybrid.

The present invention has an object to achieve a composite formation that the conductive polymer colloids are strongly adsorbed on or bonded to the circumference of the conductive oxide colloids.

In order to obtain the objective composite conductive sol by stably mixing colloids which originally form agglomerate and gel, it is necessary to mix under strong stirring in a concentration such that remarkable agglomeration does not occur.

Mixing and stirring are conducted using the conductive oxide sol in a concentration of 0.1 to 5% by weight and the conductive polymer colloidal solution in a concentration of 0.01 to 0.5% by weight at a temperature of 100° C. or less, and preferably at room temperature, for 0.1 to 5 hours under strong stirring.

The proportion of the conductive oxide sol and the conductive polymer colloidal solution is preferably 98/2 to 5/95 in a conductive oxide/conductive polymer weight ratio. If the proportion of the conductive oxide is over the range, properties of the conductive oxide sol become predominant, and the effect by composite formation cannot sufficiently be obtained. Further, if the proportion of the conductive polymer is over the range, properties of the conductive polymer become predominant, and the effect by composite formation cannot sufficiently be obtained. In the hybrid of the conductive oxide colloids and the conductive polymer colloids, it is possible to have good conductivity under low concentration, that is, under a state that the amount of hybridized colloidal particles in a binder is small, by appropriately selecting the ratio of the conductive oxide and the conductive polymer, and making the number of fine colloids of the conductive polymer in excess.

The organic-inorganic composite conductive sol (hybrid sol) of the conductive oxide and the conductive polymer thus obtained by composite formation has a particle size of 100 to 300 nm by the measurement with a laser scattering method.

In particular, the conductive polymer colloids have properties that tend to agglomerate, the colloids behave just like fibrous particles and therefore are apt to develop good conductivity.

Disper, homogenizer, mixer, Satake type mixer or the like can be used for mixing, and a mixer having a large shear force is preferable.

After mixing, the mixture can be concentrated to a concentration of 1 to 30% by weight. The concentration is conducted by an evaporation using, for example, an evaporator under atmospheric pressure or reduced pressure, or an ultrafiltration. From the organic-inorganic composite conductive aqueous sol thus produced, an organic-inorganic conductive organosol can be produced by solvent substitution that a dispersion medium is changed from water to an organic solvent such as methanol or ethanol.

The organic-inorganic composite conductive sol (hybrid sol) comprising the conductive oxide and the conductive polymer according to the present invention is used alone or is used by mixing with an organic or inorganic binder.

Examples of the organic binder which can be used include aqueous medium type binders such as acrylic or acryl styrene type resin emulsions; resin emulsions such as polyester emulsion, epoxy resin emulsion or silicone resin emulsion; aqueous binders such as water-soluble polymers(e.g., polyvinyl alcohol or melamine resin liquid); and organic solvent type binders such as hydrolyzed liquids of silane coupling agents such as (γ-glycidoxypropyl trimethoxysilane, ultraviolet curing acrylic resin liquids, epoxy resin liquids, silicone resin liquids or solution liquids of organic solvents such as polyvinyl acetate, polycarbonate, polyvinyl butyrate, polyacrylate, polymethacrylate, polystyrene, polyacrylonitrile, polyvinyl chloride, polybutadiene, polyisoprene or polyether.

Examples of the inorganic binder which can be used include ethylsilicate hydrolyzed liquid, silica sol, specific water glass, and the like.

In the case that the organic-inorganic composite conductive sol of the present invention is used as a photographic material, it is preferable to add to the sol, as a binder, cellulose derivatives such as cellulose acetate, cellulose acetophthalate, cellulose ether phthalate or methyl cellulose; soluble polyimides; emulsion polymerized copolymer such as copolymers of styrene and maleic anhydride or copolymers of styrene and methyl acrylate vinylidene chloride or itaconic acid; and gelatin.

The substrates which can be subjected to antistatic or conductive treatment using the organic-inorganic composite conductive sol of the present invention include molded articles of organic plastics, polycarbonates, polyamides, polyethylene, polypropylene, polyvinyl chlorides, polyesters, cellulose acetate and cellulose, and inorganic materials such as glasses or ceramic materials of aluminum oxide, and/or silicon dioxide.

The organic-inorganic composite conductive sol of the present invention can be used in antistatic, electromagnetic wave shielding and heat shielding of display devices such as LCD, CRT or plasma display by mixing with the above-described organic or inorganic binders, a sol liquid obtained by hydrolysis of a metal alkoxide such as tetraethoxysilane, or a photocurable resin such as epoxy or acrylic resin. Further, it is possible to coat the organic-inorganic composite conductive sol of the present invention on the substrate, followed by coating the organic or inorganic binders and a sol liquid obtained by hydrolysis of a metal alkoxide such as tetraothoxysilane, or a photocurable resin such as epoxy or acrylic resin thereon.

EXAMPLES

The present invention is described below in more detail by the following examples, but the invention is not limited thereto.

Example 1

Anhydrous zinc antimonate aqueous sol was obtained by the method described in JP-A-6-219743. The anhydrous zinc antimonate aqueous sol obtained on a transparent, bluish green sol with a pH of 3.2 and a concentration of 12%. The sol had a conductivity of 132.5 μs/cm, and thus did not substantially contain ions. This sol was diluted with pure water to a concentration of 0.2%. The resulting solution had a transmittance of 60.2%. Further, a particle size of a dried product of this sol calculated from a specific surface area by the BBT METHOD and a primary particle size of this sol by the observation with a transmission electron microscope were 15 nm. A transmission electron micrograph (magnification: 200,000) of this anhydrous zinc antimonate aqueous sol is shown in FIG. 1.

A commercially available product, Baytron P (trade name, a product of Bayer AG) was used as a polythiophene colloidal solution. The Baytron P is an aqueous dispersion of polyethylene-dioxythiophene colloid, having a structure represented by the following formula:

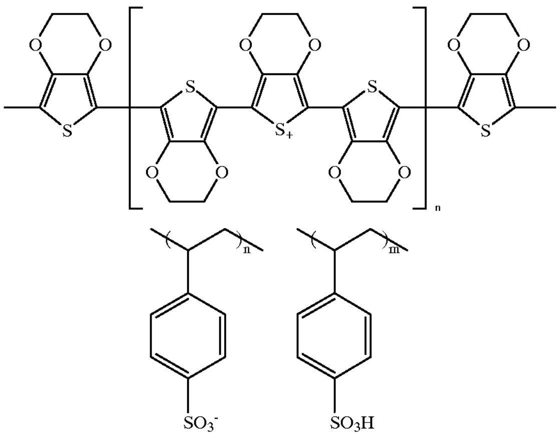

and contains polystyrenesulfonic acid as a dopant.

As a result of observation with a tramission electron microscope, it was observed that Baytron P was comprised of particles agglomerated into a spherical shape of 10 to 100 nm, agglomerates of fibrous particles having a minor axis of 2 to 5 nm and a major axis of 50 to 100 nm, and agglomerates of particles having the indefinite shape of several nm. Prom the quantitative point, it was confirmed that the proportion of agglomerates of particles having a primary particle size of 2 to 10 nm was large.

Figure 2:
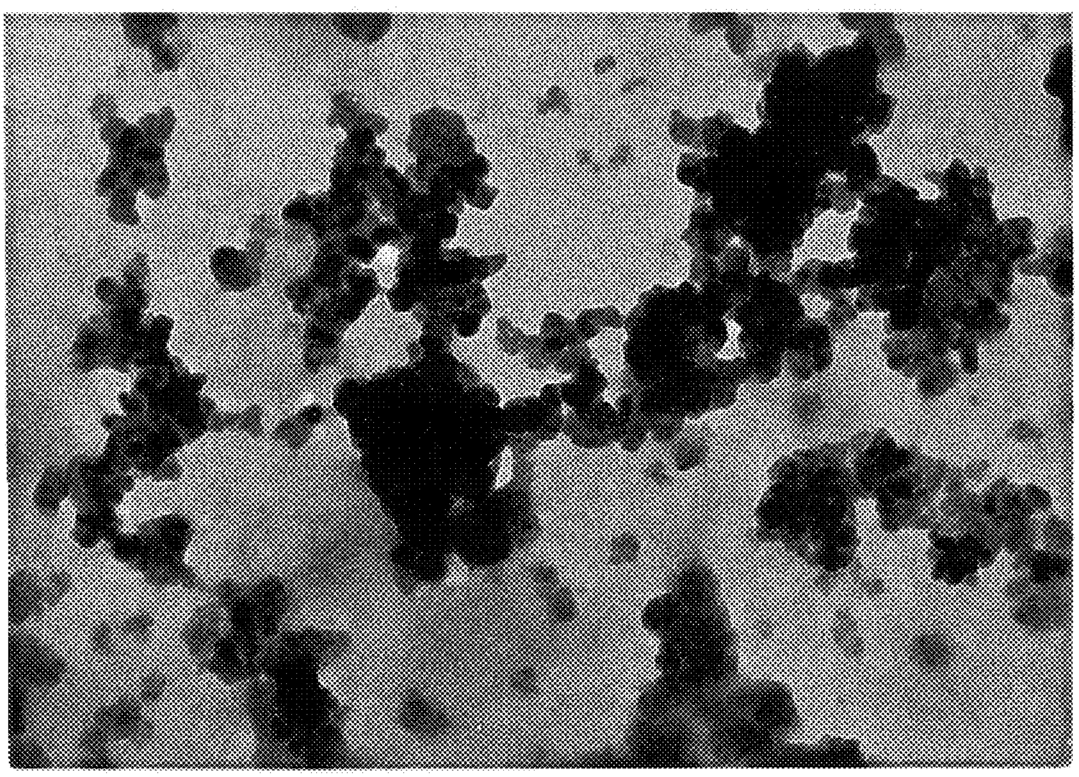
FIG. 2 is a transmission electron micrograph (magnification: 200,000) showing a particle structure of an organic-inorganic composite conductive sol comprising particles in which polythiophene colloids are adsorbed on or bonded to the periphery of anhydrous zinc antimonate particles produced in Example 1.

432.5 g of the anhydrous zinc antimonate aqueous sol obtained above was diluted with pure water to 1,731 g. A solution obtained by diluting 250 g of the polythiophene colloidal solution (Baytron P. trade name, a product of Bayer AG, concentration: 1.3%) with pure water to 1.810 g was added to the above solution with stirring using a disper. After the addition, the resulting solution was further stirred with a disper for 1.5 hours. The resulting organic-inorganic composite conductive sol was concentrated to 735 g using a rotary evaporator. The organic-inorganic composite conductive sol thus obtained had a conductive oxide/conductive polymer-weight ratio of 94.2/5.8, a concentration of 7.3%, a pH of 2.5 and a particle size of 157 nm measured with a particle size distribution measurement device by laser scattering method. This sol was diluted with pure water to 0.2% and the resulting solution had a transmittance of 44.9%. This sol was coated on a glass plate using an applicator having a clearance of 10 μm, and dried at 110° C. The resulting coating layer had a surface resistance of 0.5 to 0.7 MΩ. Further, a dried product of this sol had a volume resistivity of 81 Ω•cm. When this sol was observed using a transmission electron microscope, it was observed that the polythiophene colloids were adsorbed on or bonded to the periphery of the anhydrous zinc antimonate particles. A transmission type electron micrograph (magnification: 200, 000) of this organic-inorganic composite conductive sol is shown in FIG. 2.

Example 2

500 g of the anhydrous zinc antimonate aqueous sol used in Example 1 was diluted with pure water to 2,000 g. A solution obtained by diluting 145 g of the polythiophene colloidal solution (Baytron P, trade name, a product of Bayer AG, concentration: 1.3%) used in Example 1 with pure water to 1,045 g was added to the above solution with stirring using a disper. After the addition, the resulting solution is further stirred with a disper for 1.5 hours. The resulting organic-inorganic composite conductive sol was concentrated to 825 g using a rotary evaporator. The organic-inorganic composite conductive sol thus obtained had a conductive oxide/conductive polymer weight ratio of 97/3, a concentration of 7.4%, a pH of 2.8 and a particle size of 151 nm measured with a particle size distribution measurement device by a laser scattering method. This sol was diluted with pure water to 0.2%, and the resulting solution had a transmittance of 51.5%. This sol was coated on a glass plate using an applicator having a clearance of 10 μm, and dried at 110° C. The resulting coating layer had a surface resistance of 1.5 to 2.3 MΩ. Further, a dried product of this sol had a volume resistivity of 151 Ω•cm.

Example 3

400 g of the anhydrous zinc antimonate aqueous sol used in Example 1 was diluted with pure water to 1,600 g. A solution obtained by diluting 346 g of the polythiophene colloidal solution (Baytron P, trade name, a product of Bayer AG, concentration: 1.3%) used in Example 1 with pure water to 2,500 g was added to the above solution with stirring using a disper. After the addition, the resulting solution was further stirred with a disper for 1.5 hours. The resulting organic-inorganic composite conductive sol was concentrated to 700 g using a rotary evaporator. The organic-inorganic composite conductive sol thus obtained had a conductive oxide/conductive polymer weight ratio of 91.5/8.5, a concentration of 7.2%, a pH of 2.3 and a particle size of 156 nm measured with a particle size distribution measurement device by a laser scattering method. This sol was diluted with pure water to a concentration of 0.2%, and the resulting solution had a transmittance of 40.4%. This sol was coated on a glass plate using an applicator having a clearance of 10 μm, and dried at 110° C. The resulting coating layer had a surface resistance of 0.3 to 0.5 MΩ. Further, a dried product of this sol had a volume resistivity of 61 Ω•cm.

Example 4

500 of the anhydrous zinc antimonate aqueous sol used in Example 1 was diluted with pure water to 2,000 g. A solution obtained by diluting 217 g of the polythiophuim colloidal solution (Baytron P, trade name, a product of Bayer AG, concentration: 1.3%) used in Example 1 with pure water to 1,563 g was added to the above solution with stirring using a disper. After the addition, the resulting solution was further stirred with a disper for 1.5 hours. The resulting organic-inorganic composite conductive sol was concentrated to 837 g using a rotary evaporator. The organic-inorganic composite conductive sol thus obtained had a conductive oxide/conductive polymer weight ratio of 95.5/4.5, a concentration of 7.4%, a pH of 2.6 and a particle size of 153 nm measured with a particle size distribution masurement device by a laser scattering method. This sol was diluted with pure water to to a concentration of 0.2%, and the resulting solution had a transmittance of 47.9%. This sol was coated on a glass plate using an applicator having a clearance of 10 μm, and dried at 110° C. The resulting coating layer had a surface resistance of 0.7 to 1.2 M Ω. Further, a dried product af this sol had a volume resistivity of 102Ω•cm.

Example 5

Anhydrous zinc antimonate aqueous sol was obtained by the method described in JP-A-6-219743. The anhydrous zinc antimonate aqueous sol obtained was a transparent, bluish green sol with a pH of 4.1 and a concentration of 20%. This sol ms diluted with pure water to a concentration of 0.2%. The resulting solution had a transmittance of 68.1%. Further, a particle size of a dried product of this sol calculated from a specific surface area by the BBT METHOD and a primary particle size of this sol by the observation with a transmission electron microscope were 15 nm.

400 g of this anhydrous zinc antimonate aqueous sol was diluted with pure water to 2,800 g. A solution obtained by diluting 400 g of the polythiophene colloidal solution (Baytron P, trade name, a product of Bayer AG, concentration: 1.3%) used in Example 1 with pure water of 1,600 g was added to the above solution with stirring using a disper. After the addition, the resulting solution was further stirred with a disper for 0.5 hours. The resulting organic-inorganic composite conductive sol was concentrated to 800 g using a rotary evaporator. The organic-inorganic composite conductive sol thus obtained had a conductive oxide/conductive polymer weight ratio of 94.2/5.8, a concentration of 10.6%, a pH of 2.6 and a particle size of 193 nm measured with a particle size distribution measurement device by a laser scattering method. This sol was diluted with pure water to a concentration of 0.2%, and the resulting solution had a transmittance of 44.9%. Further, a dried product of this sol had a volume resistivity of 105 Ω•cm.

Example 6

Anhydrous zinc antimonate aqueous sol was obtained by the method described in JP-A-6-219743. The anhydrous zinc antimonate aqueous sol obtained was a transparent, bluish green sol with a pH of 3.2 and a concentration of 12.5%. This sol had a conductivity of 102.0 μs/cm. and did not substantially contain ions. This sol was diluted with pure water to a concentration of 0.2%. The resulting solution had a transmittance of 38.6%. Further, a particle size of a dried product of this sol calculated from a specific surface are by the BET METHOD and a primary particle size of this sol by the observation with a transmission electron microscope were 20 nm.

482 g of this anhydrous zinc antimonate aqueous sol wus diluted with pure water to 2,000 g. A solution obtained by diluting 288 g of a Polythiophene colloidal solution (Baytron P, trade name, a product of Bayer AG, concentration: 1.3%) with pure water to 1,800 g was added to the above solution with stirring using a disper. After the addition, the resulting solution was further stirred with a disper for 1.5 hours. The resulting organic-inorganic composite conductive sol was concentrated to 850 g using a rotary evaporator. The organic-inorganic composite conductive sol thus obtained had a conductive oxide/conductive polymer weight ratio of 94.2/5.8, a concentration of 7.4%, a pH of 2.4 and a particle size of 170 nm measured with a particle size distribution measurement device by a laser scattering method. This sol was diluted with pure water to a concentration of 0.2%, and the resulting solution had a transmittance of 31.1%. This sol was coated on a glass plate using an applicator having a clearance of 10 μm, and dried at 110° C. The resulting coating layer had a surface resistance of 0.5 to 0.7 MΩ. Further, a driedproduct of this sol had a volume resistivity of 74 Ω•cm.

Example 7

500 g of the anhydrous zinc antimonate aqueous sol used in Example 1 was diluted with pure water to 2,000 g. A solution obtained by diluting 1,154 g of the polythiophene colloidal solution (Baytron P. trade name, a product of Bayer AG, concentration: 1.3%) used in Example 1 with pure water to 8,300 g was added to the above solution with stirring using a disper. After the addition, the resulting solution was further stirred with a disper for 2 hours. The resulting organic-inorganic composite conductive sol us concentrated to 1,180 g using a rotary evaporator. The organic-inorganic composite conductive sol thus obtained had a conductive oxide/conductive polymer weight ratio of 80/20, a concentration of 6.4%, a pH of 2.0 and a particle size of 173 nm by the measurement with a particle size distribution measurement device by a laser scattering method. This sol was diluted with pure water to a concentration of 0.2%, and the resulting solution had a transmittance of 18.5%. This sol was coated on a glass plate using an applicator having a clearance of 25 μm, and dried at 110° C. The resulting coating layer had a surface resistance of 0.1 to 0.4 M Ω. Further, a dried product of this sol had a volume resistivity of 106Ω•cm.

Example 8

108 g of the anhydrous zinc antimonate aqueous sol used in Example 1 was diluted with pure water to 433 g. A solution obtained by diluting 1,000 g of the polythiophene colloidal solution (Baytron P, trade name, a product of Bayer AG, concentration: 1.3%) used in Example 1 with pure water to 7,220 g was added to the above solution under stirring with a disper. After the addition, the resulting solution was further stirred with a disper for 2 hours. The resulting organic-inorganic composite conductive sol was concentrated to 1,000 g using a rotary evaporator. The organic-inorganic composite conductive sol thus obtained had a conductive oxide/conductive polymer weight ratio of 50/50, a concentration of 2.7%, a pH of 1.9 and a particle size of 159 nm measured with a particle size distribution measurement device by a laser scattering method. This sol was diluted with pure water to a concentration of 0.2%, and the resulting solution had a transmittance of 5.0%. This sol was coated on a glass plate using an applicator having a clearance of 80 μm, and dried at 110° C. The resulting coating layer had a surface resistance of 0.02 to 0.03 MΩ. Further, a dried product of this sol had a volume resistivity of 98 Ω•cm.

Example 9

27 g of the anhydrous zinc antimonate aqueous sol used in Example 1 was diluted with pure water to 108 g. A solution obtained by diluting 1,000 g of the polythiophene colloidal solution (Baytron P, trade name, a product of Bayer AG, concentration: 1.3%) used in Example 1 with pure water to 7,220 g was added to the above solution with stirring using a disper. After the addition, the resulting solution was further stirred with a disper for 2 hours. The resulting organic-inorganic composite conductive sol was concentrated to 1,000 g using a rotary evaporator. The organic-inorganic composite conductive sol thus obtained had a conductive oxide/conductive polymer weight ratio of 20/80, a concentration of 1.7%, a pH of 1.9 and a particle size of 191 nm measured with a particle size distribution measurement device by a laser scattering method. This sol was diluted with pure water to a concentration of 0.2%, and the resulting solution had a transmittance of 1.5%. This sol was coated on a glass plate using an applicator having a clearance of 125 μm, and dried at 110° C. The resulting coating layer had a surface resistance of 0.02 to 0.03 M Ω. Further, a dried product of this sol had a volume resistivity of 155Ω•cm.

Comparative Example 1

To 432.5 g of the anhydrous zinc antimonate aqueous sol (concentration: 12%) used in Example 1 was added 250 g of the polythiophene colloidal solution (Baytron P, trade name, a product of Bayer AG, concentration: 1.3%) used in Example 1 with stirring using a disper. After the addition, the resulting solution was further stirred with a disper for 1.5 hours. Agglomerates were formed at the addition of the polythiophene colloidal solution, and the agglomerates did not disappear even after stirring for 1.5 hours. In this mixture, while the agglomerates precipitated to form two layers, the supernatant was a composite sol.

Comparative Example 2

A KOH aqueous solution was added to the acidic anhydrous zinc antimonate aqueous sol used in Example 1 to obtain a stable alkaline sol having a pH of 8. This alkaline sol and the polythiophene colloidal solution used in Example 1 were mixed in the proportion as in Comparative Example 1. At the time of mixing, remarkable agglomerates formed, and these agglomerates did not disperse by stirring. The entire agglomerates precipitated. The supernatant was only Baytron.

The effects of the present invention

The composite sol of the conductive oxide and the conductive polymer according to the present invention is that a dried product thereof (coating layer) shows less coloration, has good transparency and shown high conductivity, even by the use of the sol alone. Thus, the stability of the sol is good. Therefore, the composite sol can be used alone as an antistatic agent.

The composite sol of the conductive oxide and the conductive polymer has a good compatibility with an organic binder, and therefore can prepare, for example, a transparent antistatic paint. The transparent antistatic paint using the organic-inorganic composite conductive sol is coated on plastic plates, plastic film or the like and dried to form a coating layer, and such a coating layer has good transparency, conductivity, flexibility and film hardness even if a thickness of the layer is large. Further, even if a thickness of the coating layer is small, the coating layer shows good and stable conductivity. Further, even if the coating layer after drying is further subjected to a processing, the conductivity of the coating layer can be maintained.

What is claimed is:

1. An organic-inorganic composite conductive sol comprising colloidal particles of conductive oxide having a primary particle size of 5 to 50 nm, and colloidal particles of conductive polymer.

2. The organic-inorganic composite conductive sol according to claim 1, wherein the colloidal particles of conductive oxide are colloidal particles of conductive zinc antimonate, colloidal particles of conductive indium antimonate, or a mixture thereof.

3. The organic-inorganic composite conductive sol according to claim 1, wherein the colloidal particles of conductive polymer have a primary particle size of 2 to 10 nm.

4. The organic-inorganic composite conductive sol according to claim 1, wherein the conductive polymer is polythiophene or polythiophene derivative.

5. The organic-inorganic composite conductive sol according to claim 1, wherein the proportion of the conductive oxide and the conductive polymer is 98/2 to 5/95 in the conductive oxide/conductive polymer weight ratio.

6. A process for producing an organic-inorganic composite conductive sol according to claim 1, wherein a conductive oxide sol having a concentration of 0.1 to 5% by weight and a conductive polymer colloidal solution in a concentration of 0.01 to 0.5% by weight are mixed and then concentrated.

7. The process for producing an organic-inorganic composite conductive sol according to claim 6, wherein the conductive oxide sol is an aqueous sol which does not substantially contain ions, and the conductive polymer colloidal solution is an aqueous colloidal solution.

8. The organic-inorganic composite conductive sol according to claim 2, wherein the colloidal particles of conductive polymer have a primary particle size of 2 to 10 nm.

9. The organic-inorganic composite conductive sol according to claim 2, wherein the conductive polymer is polythiophene or polythiophene derivative.

10. The organic-inorganic composite conductive sol according to claim 3, wherein the conductive polymer is polythiophene or polythiophene derivative.

11. The organic-inorganic composite conductive sol according to claim 2, wherein the proportion of the conductive oxide and the conductive polymer is 98/2 to 5/95 in the conductive oxide/conductive polymer weight ratio.

12. The organic-inorganic composite conductive sol according to claim 3, wherein the proportion of the conductive oxide and the conductive polymer is 98/2 to 5/95 in the conductive oxide/conductive polymer weight ratio.

13. The organic-inorganic composite conductive sol according to claim 4, wherein the proportion of the conductive oxide and the conductive polymer is 98/2 to 5/95 in the conductive oxide/conductive polymer weight ratio.

* * * * *